Patented Dec. 19, 1939

2,183,687

UNITED STATES PATENT OFFICE 2,183,687

SAUSAGE LINK FORMING MACHINE

Joseph H. Miller, San Diego, Calif.

Application January 27, 1937, Serial No. 122,634

6 Claims. (Cl. 17—34)

This invention has relation to the manufacture of sausages of that character in which the stuffed or filled sausage casings of many feet in length are divided into individual sausages and formed into connected sausages by twisting the integument constituting the casing at intervals corresponding to the desired length of the sausages and thus producing a chain of linked sausages which may be afterwards separated or severed from the rest of the chain according to the dealer's or consumer's requirements.

The object of the invention is to provide a novel method and apparatus for the production of linked sausage units in which the several operations are automatic, expeditious, and economical and of such a character that the production of the linked sausages may be conducted on an unusual and extensive scale.

The invention as herein disclosed and claimed consists in the novel construction and combination of mechanically controlled elements having in view the accomplishment of the objects above mentioned and other objects to be hereinafter explained.

In Letters Patent of the United States, Number 1,839,043, heretofore granted to me on the 29th day of December 1931, I have shown and described a sausage link forming system and apparatus wherein the sausage casings filled with sausage meat and ready to be formed into links are fed through a series of drums located within a chute and equipped with means for compressing a length of filled sausage casing at measured points to provide necks and divide the unlinked stock into sausage units and with means for imparting rotary motion to said drums consecutively and for causing the neck portions to be twisted in each drum preparatory to the engagement of a following drum.

In the system disclosed in my former patent above referred to the operations are of an intermittent character in that each charge of the link forming mechanism is subjected to treatment resulting in the completion of the linking of each casing section or length prior to the insertion of another charge. According, however to my present invention means are provided whereby the operation of the link forming mechanism is substantially continuous and devoid of inactivity during certain periods incident to the necessity of completing the link forming operation on each separate charge of the material being treated before the starting of operations on another charge the effect being a loss of time on the part of the operators and a limitation of the productiveness of the actual link forming unit.

In a link forming equipment of the general character of my patented machine and of my present invention—a complete plant comprises a number of link forming units each constructed and adapted to completely form linked chains—it is intended to employ a number of units arranged in parallel relation and operated from a common source of power, the connections being such that one or more units can be operated at a time and that different units are so constructed and arranged as to permit of the formation of links of different lengths and thicknesses simultaneously or separately.

It is further proposed to increase the capacity of a link forming machine by the provision of means whereby the stuffed sausage stock or casings may be fed to the link forming devices in rapid succession and without the necessity of discontinuing the operations of the actual neck forming and twisting means to enable the twisted and linked sausages of a charge to be removed from the link forming means and the latter recharged.

It has been customary in the construction and operation of link forming machines to provide for the compression of the filled casings at prescribed intervals to form necks to be afterwards twisted to complete the formation of the links. Such compression or flattening of the filled casings has heretofore been accomplished as a single operation which has been found imperfect in that the single act of compression does not sufficiently displace the sausage material to produce a perfectly flattened neck adapted to be twisted in a desirable manner and result in uniformity of the neck portion of the links. To avoid this difficulty I have provided means whereby the necks of the sausage casings are produced by a gradually increasing pressure which effectively and without damage to the stock empties the casing at the neck forming points and produces neck portions of uniform and readily twistable character, and devoid of tendency of the linked sausages to untwist.

In the construction and operation of link forming machines it has been the practice to twist the sausages, after the forming of the necks, in one direction only. This has been found to be an imperfect system as the links have a tendency to untwist at the neck portions and lose much of their desirable character.

According to my present invention I have overcome this objection by the provision of means

Dec. 19, 1939.    C. G. OLSON    2,183,689
THREAD FORMING MECHANISM
Filed July 7, 1937    3 Sheets-Sheet 3
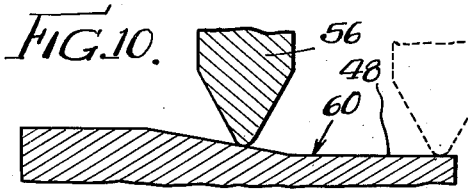
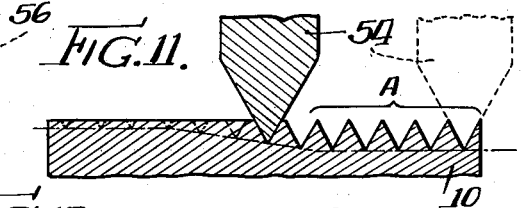
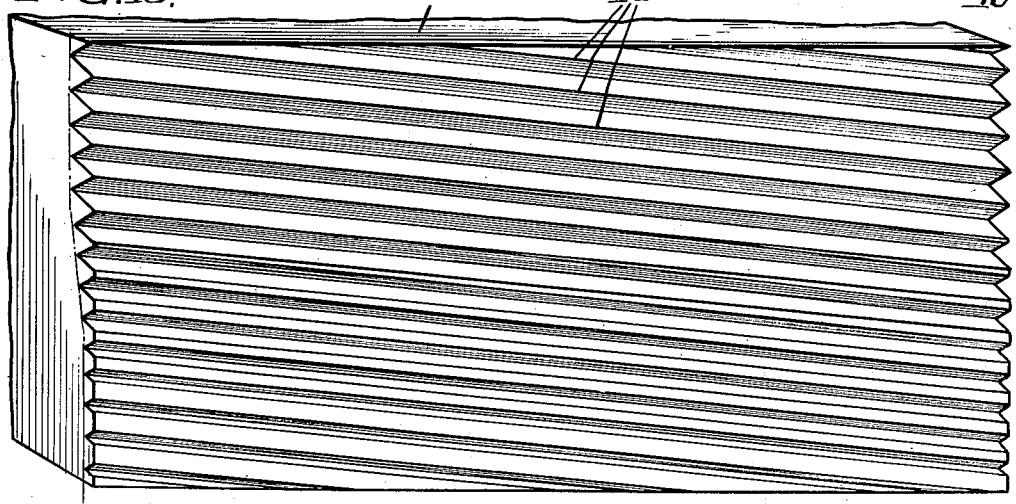
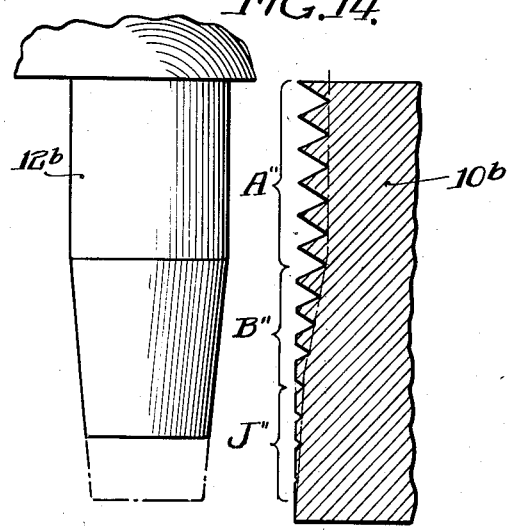
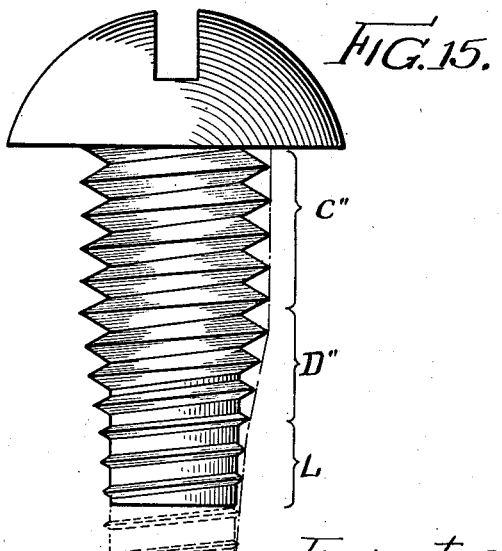
Inventor
Carl G. Olson
By:- Cox & Moore attys.

Patented Dec. 19, 1939

2,183,689

UNITED STATES PATENT OFFICE 2,183,689

THREAD FORMING MECHANISM

Carl G. Olson, Chicago, Ill., assignor to Illinois Tool Works, Chicago, Ill., a corporation of Illinois Application July 7, 1937, Serial No. 152,328

5 Claims. (Cl. 80—9)

This invention relates generally to thread forming mechanism, and more particularly to the forming of screw threads of the type adapted for screws designed to form their own thread in an unthreaded aperture of hard material such as metal, Bakelite, fiber, etc.

Providing screws of the self-tapping or self-threading type with a thread of particular V-shaped cross-section at the entering end greatly facilitates the ease with which the screw may be inserted within the unthreaded aperture of a work piece—for example, within an unthreaded aperture of a piece of metal or material of similar hardness. Conventional thread rolling mechanisms and methods of rolling threads have not been designed nor adapted for producing screw threads of the type contemplated herein—namely, screw threads which, when incorporated in a screw body, will serve to facilitate the ease with which screws may be inserted within an unthreaded aperture to form an internal thread. I refer more particularly to screw threads of the type wherein a substantially uniform V-shaped crown cross-section is maintained throughout the extent of the screw so as to provide an effective work engaging edge, and when traversed by a recess, to provide an effective serrated cutting edge.

In practicing the method of thread forming contemplated hereby, I propose to form a novel arrangement of serrations on the working side of a die block by forming a plurality of serrations of constant depth and a plurality of serrations of diminishing depth, which may subsequently be employed to produce their counterparts in the form of a thread on a screw blank.

More specifically, the invention contemplates cutting a plurality of parallel serrations of constant depth in the working surface of a die block by the use of a tool, and also relatively shifting the die block and tool so as to produce a plurality of parallel serrations or grooves of diminishing depth along another section of said working surface, whereby when a screw blank is engaged by said working surface, counterparts in the form of a thread of constant height along one portion of the screw and the thread of diminishing height along the entering portion of the screw may be produced.

My invention also contemplates thread forming mechanism and methods whereby screws referred to above, which are adapted to form their own thread in a work piece, may be produced with a core or root diameter at the entering end, which is at least as great as the core or root diameter on the holding portion of the screw.

The foregoing and numerous other objects and advantages will be more apparent from the following detailed description when considered in connection with the accompanying drawings, wherein—

Figure 1 is a perspective view of a pair of thread rolling dies of the type contemplated by the present invention, a partially rolled screw blank being shown in operative association with the working faces of said dies;

Figure 2 is an enlarged vertical sectional view of one of the dies of Figure 1 positioned adjacent a screw blank which is adapted to be rolled by said die;

Figure 3 is a side elevational view of the screw after it has been rolled between dies of the type shown in Figures 1 and 2, the extension shown in the dotted lines on the screw indicating the manner in which the thread on the blank of Figure 2 will be rolled if an extension, as indicated by the dot-and-dash lines of Figure 2, is provided on the screw blank;

Figure 4 discloses a die of slightly modified cross-sectional form in association with a screw blank;

Figure 5 is a side elevational view of a screw adapted to be rolled by dies of the type shown in Figure 4, the screw of Figure 5 differing from the screw of Figure 3 in that the core or root diameter at the entering end increases, whereas the core diameter of the screw in Figure 3 is constant throughout the entire extent of the screw body;

Figure 6 is a plan view of a mechanism whereby thread rolling dies of the type contemplated herein may be very expeditiously provided with a predetermined arrangement of serrations along the working face thereof, which are adapted to form counterparts in a screw blank conforming with the thread configuration on the screw of Figure 3, said mechanism being shown in association with fragmentary portions, such as fragmentary portions of the table and spindle of a conventional milling machine;

Figure 7 is a sectional view of the above mentioned mechanism taken substantially along the line 7—7 of Figure 6;

Figure 8 is a view taken substantially along the line 8—8 of Figure 7;

Figure 9 is a fragmentary plan view of a modified mechanism whereby a plurality of die blocks may be simultaneously machined so as to provide serrations capable of producing counterparts in a screw blank in the form of a thread corresponding to the thread shown in Figure 3;

Figures 10 and 11, respectively disclose the relative positions of the follower-templet and the rotary cutter-screw blank to more clearly illustrate the position occupied by said parts during the cutting operation;

Figure 12 is an enlarged, fragmentary, transverse sectional view of a die block in which the serrations have been provided by the cutting tool illustrated in Figure 11;

Figure 13 is a perspective view of the completed die block showing the arrangement of the serrations on the working face thereof;

Figure 14 discloses, in cross-section, a modified die block and screw blank associated therewith; and Figure 15 discloses a screw having a thread resulting from the use of the die and blank shown in Figure 14, the dotted extension in Figure 15 illustrating the form of the screw when the die of Figure 14 is rolled upon the blank of Figure 14 having an extension shown by dot-and-dash lines of Figure 14.

Referring now to the drawings more in detail wherein like numerals have been employed to designate similar parts throughout the various figures, it will be seen that the invention contemplates means in the form of dies or die blocks 10, whereby my improved method of thread rolling may be effectively practiced. The die blocks 10 are preferably of a size and shape which enables them to be mounted in conventional thread rolling machines (not shown). In these conventional machines one of the dies is held in a fixed position and the other is reciprocably mounted. In Figure 1 the foremost die block is stationary, whereas the rearmost die is reciprocable. A screw blank indicated generally by the numeral 12 is adapted to be rolled between the working faces 14 of the die blocks, the blank being initially positioned at the right end of the front block, the reciprocable die block serving to grip the blank and roll it between said working surfaces 14.

Particular attention is directed to the structural characteristics of the working surfaces 14, and these characteristics may best be observed in Figure 2. Each working surface 14 comprises a plurality of serrations which are inclined with respect to the horizontal in accordance with the desired thread angle in the completed screw. The serrations on each working surface 14 may be divided into two distinct groups, one group being indicated by the bracket A (Figure 2) and the other group being indicated by the bracket B in Figure 2. The group A constitutes serrations of constant height which, when impressed within the corresponding portion C of the screw blank 12, produces threads of constant height and constant root diameter indicated by the bracket C in Figure 3. This portion C of the screw may properly be referred to as the holding portion because this is the part of the screw which is held within the work.

The portion B of the die 10 includes parallel serrations which gradually diminish in height with respect to a plane indicated by a dot-and-dash line E of Figure 2. This plane E is coincident with the crests of the constant height serrations included within the bracket A of Figure 2. A dot-and-dash line F (Figure 2) indicates the degree with which the serrations B diminish in height. Attention is directed to the fact that the included angle of the serrations on the die 10 indicated by the letter G (Figure 2) remains constant along the sections A and B. In other words, the included angle of the walls defining the parallel ribs or ridges on the die 10 remains constant. Thus, although the V-shaped recesses included within the group B on the die 10 become shallower, the side walls which define these recesses have a constant included angle, so that in cross section the V bottoms of the serrations included within groups A and B remain constant. Furthermore, the distance between the bottoms of the V grooves in the die 10 measured along a line parallel with the dot-and-dash line E is constant.

In addition to the foregoing structural characteristics, it will be noted that the outer surfaces or crests of the ribs included within the zone B are provided with flat surfaces H, which lie in a plane parallel with the plane indicated by the dot-and-dash line E and which increase in width toward the lower portion of the section or zone B. The letter D in Figure 2 indicates the portion of the screw blank which is adapted to be acted upon by the zone B of the die 10, and in Figure 3 the portion D of the screw is formed by the serrations of the die section B. The included thread angle G of the die 10 produces a thread in the screw having the same included angle, and the flat surfaces H of the ribs on the section B of the die produce corresponding exposed peripheral core surfaces H on the screw of Figure 3. These exposed core surfaces H increase in axial width and the diameter thereof remains constant, said diameter being equal to the root diameter along the portion C of the screw. The fact that the outermost portions of the die serrations or teeth lie within a common plane which is parallel with the plane E positively prevents the diameter of the exposed core portions H from being less or greater than the root diameter of the full threads along the section C, provided that the taper of the blank 12 is such as to enable the valleys or grooves within the die 10 to be completely filled by the material of the blank. In other words, the taper of the blank 12 must be so related to the tapering of the grooves of the die as indicated by the dot-and-dash line F of Figure 2 as to insure complete filling of the grooves in the die. Any insufficiency of material in the blank would cause an incomplete or unfilled thread to be formed by the die. Also, the serrated working surfaces 14 of the die blocks must be accurately spaced in accordance with the diameter of the screw blank in order to insure the proper formation of the threads.

It will be apparent from the foregoing that the invention contemplates a method of thread rolling whereby incomplete or unfilled threads at the entering end of a screw are eliminated. In conventional types of die blocks which have heretofore been used in rolling screw threads, the serrations or die teeth are of substantially equal depth over the entire working face of the die. Hence, if a screw blank having a slightly tapered end is rolled between a pair of such dies, the insufficiency of the metal, due to the presence of the taper in the blank, will result in the formation of incomplete or unfilled thread convolutions in the screw. The present invention contemplates the complete avoidance of such thread formations, and, in fact, insures the formation of thread convolutions extending along both the holding and the thread forming portions of the screw which have a perfect uniform crown cross section. When the thread forming screw provided with the thread structure shown in Figure 3 is hardened and applied to an unthreaded aperture in a work piece, it is only necessary for the entering thread convolutions to slightly engage the work so as to start a helical path in the work. As the screw continues to be turned into the work, it is necessary for the succeeding thread convolutions to become greater in height until the full height of the thread on the holding portion is reached. By having the core portions along the entering end of the screw exposed, as indicated by the surfaces H, the strength of the screw at this extremity is maintained. On smaller sized screws, when the valley of the thread extends below the root diameter of the holding portion, the core is materially weakened. By employing the herein described method of thread rolling, the strength of the screw at the entering end is not impaired because the core diameter is not less than the root diameter of the holding portion, and at the same time the thread in the vicinity of the exposed core surfaces H sufficiently extends outwardly therefrom to effectively engage the work in forming a female thread in the work.

The die 10 is also provided with a section or zone indicated by the letter J (Figure 2). If it is desired to continue the thread of small height beyond the point indicated by the solid lines in Figure 3, it is only necessary to roll the thread on the blank which includes the dot-and-dash portion indicated in Figure 2. This will cause the screw to be formed with the thread convolutions and juxtapositioned exposed core surfaces indicated by the dotted lines in Figure 3. This structure affords a plurality of convolutions at the entering end of the screw of constant height which merge with the thread forming section D of the screw.

In Figure 4 a slightly modified die is shown which is designated generally by the numeral 10a. This die is provided with a working face 14a designed to cooperate with a companion oppositely disposed working face in rolling a thread upon a screw blank 12a. The die 10a is provided with a zone or section A' and a section or zone B'. The serrations or teeth within the zone A' are constant in height and extend in parallelism similarly to the serrations or teeth A of the die 10. The outer edges of the serrations in the zone A' are positioned within a common plane designated by the dot-and-dash line E'. The bottoms of the grooves in the die 10a positioned within the zone B' taper with respect to the plane E', as indicated by the dot-and-dash line F'. The ribs or serrations included within the zone B' have flat outer surfaces H' which increase in width toward the bottom of the die. Particular attention is directed to the fact that these flat surfaces H' of increasing width lie in a plane designated by a dot-and-dash line K which is angularly disposed with respect to the plane E'. This is to be distinguished from the outer surfaces H of the die 10 (Figure 2) which lie within the plane E.

When the blank 12a is rolled between a pair of the dies 10a, the die serrations in the zone A' produce thread convolutions of constant height and constant root diameter along the portion C' of the screw blank 12a, and the serrations or die teeth in the zone B' act upon the portion D' of the screw blank 12a. Referring to Figure 5, it will be seen that the holding portion C' of the screw is rolled by the zone A' of the die 10a, and the entering or thread forming portion D' of the screw is formed by the zone B' of the die. By reason of the angular disposition of the plane K with respect to the plane E', the exposed peripheral core surfaces extending between the thread convolutions at the entering end of the screw (Figure 5) increase in diameter toward the entering end thereof. This is to be distinguished from the exposed core surfaces H of the screw in Figure 3, which are of a constant diameter equal to the root diameter of the holding portion C. The increase in the core diameter toward the entering end of the screw lends additional strength to the screw body in this vicinity and has other functional advantages over the screw shown in Figure 3.

In addition to the foregoing steps, the present invention contemplates the novel steps of forming serrations in a die block which, when applied to a screw blank, will produce their counterparts in the form of the thread illustrated in Figures 3 and 5. Referring more particularly to Figures 6 to 13, inclusive, it will be seen that the present invention contemplates a mechanism designated generally by the numeral 16 (Figures 6 and 7), whereby the aforesaid novel steps may be practiced. This mechanism 16 is adapted to be supported on a table 18 of a conventional milling machine, and includes a support or plate 20, one extremity of which is pivotally supported by a horizontal shaft 22 journaled between brackets 24 which are adapted to be adjustably secured to the table 18 by means of bolts 26. The plate or support 20 is continuously urged upwardly by means of a yieldable member or spring 28 interposed between the bottom of the plate and the upper surface of the table 18. An adjustable stop screw 30 is threaded within a bracket 32, which bracket is adjustably secured to the table 18 by means of bolts 34. The screw 30 may be conveniently adjusted by manual manipulation of a handle 36 carried at the upper end thereof to properly position the lower end of the screw which is engaged by the upper surface of the plate 20.

The plate 20 provides a support for a series of parallel strips 38, 40, and 42 secured in a fixed position to the plate by means of screws 44. The spacing between the strips 38 and 40 is such as to accommodate the die block 10, previously referred to in connection with Figures 1 and 2, a pair of set screws 46 serving to secure said die block in a fixed position upon the table 20. The space between the strips 40 and 42 is such as to accommodate a templet or former 48, which, like the die block 10, is adapted to be secured in position by means of suitable set screws 50.

A conventional milling machine spindle or arbor 52 traverses the upper faces of the die block 10 and the templet 48, and carries a milling cutter 54 which is adapted to rotate with the arbor or spindle 52 and a follower 56, which is freely rotatable upon the spindle 52 through the agency of suitable anti-friction bearings 58. The milling cutter 54 has a cross-sectional form along its cutting zone, which is in conformity with the thread cross-section which is desired to be rolled upon a screw blank—for example, the V-shaped cross-section, the angularity of which is indicated by the letter G in Figure 2. The follower 56 corresponds in external diameter with the external diameter of the cutter 54 and is adapted to be engaged by the surface 60 of the templet 48 as an incident to the yieldable action of the spring 28 urging the plate 20 and templet 48 supported thereby in an upward direction.

Thread rolling dies, as previously pointed out, are made up of a plurality of serrations 14, and it will be noted that, while the serrations in each die block are parallel with each other, they are inclined with respect to the horizontal, as clearly indicated in Figures 1 and 13. This inclination corresponds with the thread helix in the screw thread to be rolled. The pitch of the thread in a screw is measured axially of the screw, whereas the pitch of the serrations in the die are measured along a line normal to the serrations. In view of the foregoing, it will be apparent that the die block 10 and the strips 38, 40, and 42 extend in a direction which is not normal to the axis of the spindle 52, the disposition of said strips and die block being such as to enable the milling cutter 54 to cut serrations along the working surfaces of the die which, when the die is mounted in the thread rolling machine, will be positioned in conformity with the helix angle of the thread to be produced.

In producing the serrations by means of the milling cutter 54, the die block with its plain upper surface is mounted upon the plate 20 and secured between the strips 38 and 40 by means of the screws 46, and the companion templet or former 48 is secured between the strips 40 and 42, as indicated in Figure 6. The milling machine table 18 is positioned so as to enable the first cut at the right side of the die block 10 (Figure 11) to produce a full depth serration, which will subsequently produce as its counterpart in a screw blank, a full height thread. When this cut is made, the milling cutter 54 occupies the dotted position shown in Figure 11 and the follower 56 occupies the dotted position indicated in Figure 10. Upon the completion of this full depth cut, the table 18 is indexed or shifted in a direction normal to the cut just made a distance corresponding with the required axial pitch of the thread to be subsequently rolled by the die. Successive full depth cuts are made until the zone A, indicated in Figures 2 and 11, has been completed. At this point the peripheral surface of the follower 56 begins to rise along the inclined surface of the templet shown in Figure 10, and therefore as successive cuts are made, the serrations become shallower until the follower engages the upper left portion of the surface 60 (Figure 10). During the engagement of the follower 56 with the aforesaid inclined surface of the templet, the zone B of the die 10 is produced. During the successive cuts made by the cutter 54, while the follower 56 is in engagement with the uppermost surface of the templet 48 (Figure 10), the shallow serrations of substantially constant depth are made along the zone indicated by the letter J in Figure 2.

From the foregoing it will be understood that the surface 60 of the templet 48 conforms with the imaginary surface of the die block 10, which is coincident with the bottom of the serrations, which surface is indicated generally by the dot-and-dash line of Figures 11 and 13. It has been found advantageous to provide a slight angularity, as indicated by the angle of 1° in Figure 12, to the outermost working surface of the die teeth in the vicinity of the shallow serrations. This serves to insure the presence of exposed peripheral core portions between the thread convolutions at the entering end of the screw (see surfaces H and H', Figures 3 and 5) having a diameter which is at least as great as the root diameter of the thread along the holding portions C—C' of the screw.

After the steps just described have been completed, the serrated die block is hardened to enable the serrations or teeth thereof to cause the formation of the screw thread when a screw blank, such as the blank 12 of Figure 1, is rolled between a pair of such die blocks. The invention herein described contemplates the method of thread forming, which includes the steps of making a succession of parallel cuts or grooves along the surface of a blank, such as a die block, relatively shifting the block and the cutting instrument so as to vary the depth of the cuts made therein, and then rolling a screw blank to reverse the formation made by the cutting instrument upon the die block, and thereby provide sharp threads along the entering portion of the screw with flat spaces or exposed peripheral core portions between them. In other words, the V-shaped bottom portions of the die serrations or grooves provide the sharp V thread on the screw blank, and the flat surfaces of varying width along one portion of the die block (see, for example, the flat surfaces on the upper teeth to the left of the blank shown in Figure 12) provide complementary exposed peripheral core surfaces toward the entering extremity of the screw. This method of making screw threads having a constant body diameter and a sharp tapering thread with flat spaces between its convolutions must be clearly distinguished from the conventional method of cutting a thread with an ordinary tool on a blank having a tapering end. By so doing, convolutions having sharp V bottoms are provided and the top of the thread along the tapered portion is flat. If the blank of the aforesaid type is rolled between what are commonly referred to as standard dies, the tapering portion of the blank will be formed with a thread, the top of which has a circumferential groove and not a single V thread, as disclosed herein. In other words, conventional thread cutting or thread rolling tools are not designed, nor have they been used for producing thread convolutions of the type contemplated herein.

In Figure 14 a die block, designated generally by the numeral 10b is shown, which is slightly modified in cross-sectional contour from the die block 10. The die block 10b includes a zone of serrations A″ of constant depth, a zone B″ of diminishing depth, and a zone J″ of serrations, which also diminish in depth. The zone J″ distinguishes from the zone J previously described in connection with Figures 1 and 2 in that the zone J″ includes serrations of diminishing depth, as distinguished from the serrations J of substantially constant depth. If a pair of die blocks 10b act upon a blank 12b, the screw thread, as shown in Figure 15, will result. This includes a zone C″ corresponding to the zones C and C' of Figures 3 and 5, a zone D″ corresponding with zones D—D', and another zone L which is produced by the zone J″ of the die block. If the blank 12b is formed with the dot-and-dash extension indicated in Figure 14, the screw of Figure 15 will have an extended thread and core indicated by the dotted lines in Figure 15.

Attention is also directed to the disclosure in Figure 9 which fragmentarily illustrated how a plurality of die blocks 10 may be simultaneously acted upon by a pair of milling cutters 54 to produce the serrations 14 previously described. To accomplish this, it is only necessary to mount two milling cutters upon the arbor 52 and to provide sufficient strips on the milling machine table to accommodate the additional die block. In all other respects the mechanism disclosed in Figure 9 is similar to the mechanism disclosed in Figures 6 to 8, inclusive.

From the foregoing description it will be understood that the present invention contemplates a novel and improved method of producing a particularly desired type of thread on a screw blank. This method embraces the novel steps of forming the serrations in the surface of a member, such as a block and the subsequent rolling of a blank between such serrations to produce screw threads of the type contemplated hereby. In practicing the method of producing screws by the use of dies similar to the die 10 in Figure 2, thread convolutions of constant height and root diameter along the holding section of the screw blank are formed, and threads of diminishing height along the entering end of the screw which have a crown cross-section corresponding with the crown cross-section of the full height threads are produced. Rolling the material of the blank causes the metal thereof to flow outwardly in a predetermined manner along the tapering portion of the blank with the result that the core diameter of the completed screw at the entering end maintains a diameter which is at least equal to the root diameter of the thread convolutions on the holding portion of the screw. Likewise, in rolling a blank by the use of dies similar to the die 10a (Figure 4), a thread configuration at the entering end of the screw is provided wherein the crown cross-section is not only maintained uniform throughout the entire length of the screw thread, but the root or core diameter at the entering end of the screw is increased toward the entering end of the screw. The above described method is particularly adaptable in connection with the production of tapping or thread forming screws which are designed to form internal machine screw threads in an unthreaded aperture of a work piece. To this end the invention contemplates a die which will produce thread convolutions having uniform axial pitch along the crest of the completely rolled thread and exposed peripheral core surfaces extending between the thread convolutions of decreasing crest diameter along the entering end of the screw. The dies which are disclosed and described herein are provided with serrated working surfaces, in which the crests and valleys thereof are located in predetermined planes. In one of the dies, namely, the die 10, the outer or crest portions of the die teeth are positioned in a common plane which enables the production of a screw having a constant core or root diameter. The other die construction, namely, the die 10a is formed with serrations or die teeth, the outer surfaces of which lie in a common plane along one zone, and in another plane along a second zone, whereby to produce a screw having a constant root diameter along the holding portion and exposed peripheral core surfaces which increase in diameter along the entering or thread forming portion.

When the thread convolutions on the entering extremity of the screws contemplated herein, are traversed by a recess, a serrated cutting edge is presented which materially contributes to the efficient functioning of the screw. In other words, a plurality of V-shaped cutting teeth are provided along the recess, as distinguished from straight edges used in conventional taps.

It will also be apparent from the foregoing that the invention contemplates methods of rolling threads in which the periphery of a metal screw blank is indented at spaced intervals so as to cause the metal along the periphery to flow, and also contemplates the step of confining the flow of metal along one zone of the blank, for example, the zones C and C' within cavities of uniform or V-shaped cross-section, for example, the V-shaped elongated cavities or recesses included within the zones A and A' of the dies, and simultaneously confining the flow of metal along a second zone, for example, the zones D—D' of the screw blank within a plurality of cavities or recesses of decreasing cross-section, for example, the elongated die cavities or recesses within the zones B—B' of the dies. Also, the points of maximum indentation along the second zone are maintained at radial distances from the blank axis which are not less than the corresponding radial distances from said axis of the points of maximum indentation along the first zone. Thus, the teeth in the die 10 will cause indentations along the zone D of the screw in Figure 3, and the maximum points of indentation along the zone D in the screw are positioned the same radial distances from the screw axis as the points of maximum indentation along the zone C. In using the die 10a, the points of maximum indentation produced by the zone B' of said die are maintained at a greater distance from the screw axis (see Figure 5) than the points of maximum indentation along the zone C' of said screw.

From the foregoing description, it will be understood that when the milling cutter 54 passes from the portion of the die having the full depth serration to the portion of the die wherein the serration is of diminishing depth, this diminishing in depth not only takes place transversely of the die block but also lengthwise of the die block, as viewed from right to left of Figure 13. Stating it another way, when the inclined or intermediate portion of the templet surface 60 engages the follower 56, the plate 20 and die block 10 supported thereby are gradually moved downwardly so as to cause the milling cutter 54 to produce a serration of diminishing depth, as viewed from the right to the left of Figure 13. This diminution in depth of the serrations, as viewed from the right to the left of Figure 13, causes a proportionate increase in the width of the flat surface on the die block presented between the serrations. Thus, these serrations of diminishing depth actually become spaced from each other, as distinguished from the juxtapositioned, full depth serrations in the die block.

In view of the fact that the follower 56 is mounted in antifriction bearings upon the milling machine arbor, no rotation is imparted to the follower by the arbor. Obviously, the follower may have various cross-sectional shapes and is not limited in shape to the follower shown in the drawings. The follower must be such that it will accurately cooperate with the templet in effecting the shifting of the die block so as to cause the milling cutter to produce serrations of the required depth in the working surface of the die block.

In considering the disclosure in the drawings, it should be borne in mind that the degree of taper on the blanks and on the teeth of the dies as shown are only illustrative. In other words, the dimensional structural features, as shown in the drawings, are only for illustrative purposes, and obviously in the practical commercial embodiment of the invention these dimensions and specific structural details may be departed from without digressing from the invention described and claimed herein.

The invention is hereby claimed as follows:

1. Thread forming mechanism including a metallic block having a working surface, said working surface including a zone comprised of elongated thread rolling die teeth of constant height and a second zone for rolling the entering portion of a screw body and provided with elongated die teeth which longitudinally decrease in height and which decrease in height as they digress laterally from the first zone, the outermost portions of the die teeth in the first zone lying in a common plane and the outermost portions of the die teeth in the second zone positioned so as not to extend beyond the above mentioned plane.

2. Thread forming mechanism including a metallic block having a working surface, said working surface including a zone comprised of elongated thread rolling die teeth of constant height and a second zone for rolling the entering portion of a screw body and provided with elongated die teeth which longitudinally decrease in height and which decrease in height as they digress laterally from the first zone, the outermost portions of the die teeth in the first zone lying in a common plane and the outermost portions of the die teeth in the second zone having flattened surfaces positioned so as not to extend beyond the above mentioned plane.

3. Thread forming mechanism including a metallic block having a working surface, said working surface including a zone of elongated thread rolling die teeth of constant V-shaped cross-section and a second zone for rolling the entering portion of a screw body and provided with elongated die teeth of longitudinally diminishing height and of diminishing truncated cross-section, the outermost portions of the die teeth in the first zone lying in a common plane and the outermost portions of the teeth in the second zone positioned so as not to extend beyond the above mentioned plane.

4. Thread forming mechanism including a metallic block having a working surface, said working surface including a zone comprised of elongated thread rolling die teeth of constant height and a second zone for rolling the entering portion of a screw body and provided with elongated die teeth which longitudinally decrease in height and which decrease in height as they digress laterally from the first zone, the outermost portions of the die teeth in the first zone lying in a common plane and the outermost portions of the die teeth in the second zone being substantially coincident with the above mentioned plane.

5. Thread forming mechanism including a metallic block having a working surface, said working surface including a zone comprised of elongated thread rolling die teeth of constant height and a second zone for rolling the entering portion of a screw body and provided with elongated die teeth which longitudinally decrease in height and which decrease in height as they digress laterally from the first zone, the outermost portions of the die teeth in the first zone lying in a common plane and the outermost portions of the die teeth in the second zone below the above mentioned plane.

CARL G. OLSON.